(12) United States Patent
Stough et al.

(10) Patent No.: US 6,226,946 B1
(45) Date of Patent: *May 8, 2001

(54) SELF-ADHESIVE DRYWALL TAPE FOR FIRE WALL

(75) Inventors: Ronald A. Stough, Madison; Edward A. Thompson, De Pere, both of WI (US)

(73) Assignee: E-Z Taping System, Inc., Green Bay, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/012,092

(22) Filed: Jan. 22, 1998

Related U.S. Application Data

(63) Continuation-in-part of application No. 08/677,382, filed on Jul. 5, 1996, now Pat. No. 5,711,124, which is a continuation-in-part of application No. 08/513,386, filed on Aug. 10, 1995, now Pat. No. 5,687,523, which is a continuation-in-part of application No. 08/297,320, filed on Aug. 26, 1994, now Pat. No. 5,486,394.

(51) Int. Cl.⁷ ...................................................... E04B 2/00
(52) U.S. Cl. ................................................. 52/417; 52/460
(58) Field of Search ............................. 52/417, 420, 476, 52/460; 428/61, 110, 343, 352, 354, 906

(56) References Cited

U.S. PATENT DOCUMENTS

| | | |
|---|---|---|
| 1,357,350 | 11/1920 | Schumacher . |
| 2,463,244 | 3/1949 | Carter . |
| 2,502,499 | 4/1950 | Ames . |
| 3,300,330 | 1/1967 | Vassel et al. . |
| 3,575,771 | 4/1971 | Padgtt . |
| 3,625,798 | 12/1971 | Ihli . |
| 3,788,941 | 1/1974 | Kupits . |
| 4,041,201 | 8/1977 | Wurker . |
| 4,042,739 | 8/1977 | Emal et al. . |
| 4,313,991 | 2/1982 | Lamb . |
| 4,331,727 | 5/1982 | Maas . |
| 4,398,985 | 8/1983 | Eagon . |
| 4,406,730 | 9/1983 | Altmix . |
| 4,522,004 | 6/1985 | Evans et al. . |
| 4,652,331 | 3/1987 | Plasencia . |
| 4,707,202 | 11/1987 | Sweeny . |
| 4,750,968 | 6/1988 | Sweeny . |
| 4,757,783 | 7/1988 | Matheny . |
| 4,792,473 | 12/1988 | Vitale . |
| 4,835,925 | 6/1989 | Hoffmann, Sr. . |
| 4,863,774 | 9/1989 | Tucker . |
| 4,913,766 | 4/1990 | Löjdström . |
| 4,977,718 | 12/1990 | Hoffman, Sr. . |
| 5,037,686 | 8/1991 | Conboy . |
| 5,198,300 | 3/1993 | Matthews et al. . |
| 5,242,725 | 9/1993 | Weissmann et al. . |
| 5,246,775 | 9/1993 | Loscuito . |
| 5,486,394 | 1/1996 | Stough . |

FOREIGN PATENT DOCUMENTS

| | | |
|---|---|---|
| 869952 | 5/1971 | (CA) . |
| 2305919 | 10/1976 | (FR) . |
| 48-27462 | 8/1973 | (JP) . |

Primary Examiner—Laura A. Callo
(74) Attorney, Agent, or Firm—Lathrop & Clark LLP

(57) ABSTRACT

An unperforated base layer has a pressure-sensitive adhesive on one side, and a release layer on the other to form a tape which may be applied from a self-wound roll to the seam between two fire-rated gypsum wall board panels to form a fire wall structure.

1 Claim, 2 Drawing Sheets

SELF-ADHESIVE DRYWALL TAPE FOR FIRE WALL

RELATED APPLICATIONS

This application is a continuation-in-part of application Ser. No. 08/677,382, filed Jul. 5, 1996, to issue as U.S. Pat. No. 5,711,124; which is a continuation-in-part of application Ser. No. 08/513,386, filed Aug. 10, 1995, now U.S. Pat. No. 5,687,523; which is a continuation-in-part of application Ser. No. 08/297,320, filed Aug. 26, 1994, and now U.S. Pat. No. 5,486,394; the disclosures of all said applications being hereby incorporated by reference herein.

FIELD OF THE INVENTION

The present invention relates to walls and barriers in general, and to industry standard rated fire walls and the materials for fabricating such walls in particular.

BACKGROUND OF THE INVENTION

Throughout the country, local building codes and national standard practices require that steps be taken in commercial and residential construction to slow the spread of fire through attics, crawlspaces, and other interior locations. One such step is the construction of fire walls from wood or metal trusses or stud walls. A fire wall is created by fastening flat modular units to the wood or metal studs. These units, known as fire-rated gypsum board, are abutted edge to edge, and provide a barrier to flame and fire-fighting water. Because of the modular construction of the gypsum board, gaps or seams are presented between individual modules. Standard practices require that these gaps be covered to reduce the rate of flame and water penetration through the fire wall. Conventionally, a paper tape has been applied to the seams and adhered thereto by a coating of a wet plaster-like compound known as mud.

Fire walls are usually not in public areas of the building, and thus do not require a high level of decorative finish. Yet the application of the liquid mud can be difficult and cumbersome, as fire walls are often located in cramped or difficult to reach spaces.

Self-adhesive drywall tapes for finish drywall have been previously suggested. An open fiberglass mesh self-adhesive drywall joint tape has been used, and a perforated self-adhesive drywall tape has also been known in finishing applications. Nonetheless, the perforations or openings in these tapes make their application in a fire wall unacceptable.

What is needed is a tape for the construction of a fire wall which may be applied in a single step without the need for application of mud.

SUMMARY OF THE INVENTION

The wall board joint tape of this invention has a base layer one surface of which is covered with a pressure sensitive adhesive for convenient application to a joint between fire-rated gypsum board panel. The opposite surface of the base layer has a release coating thereon, so the adhesive coated tape may be wound on itself in a roll for convenient dispensing. The base layer may be paper or plastic material.

It is an object of the present invention to provide a tape for application to fire-rated gypsum board panels which is self-adhesive and which does not require application of mud to adhere to the panels.

It is a further object of the present invention to provide a paper tape assembly for application to fire-rated gypsum board panels which may be wound in rolls for releasable engagement with itself.

It is an additional object of the present invention to provide a tape for application in fire walls.

Further objects, features and advantages of the invention will be apparent from the following detailed description when taken in conjunction with the accompanying drawings.

DESCRIPTION OF THE PREFERRED EMBODIMENTS

Figure 1:
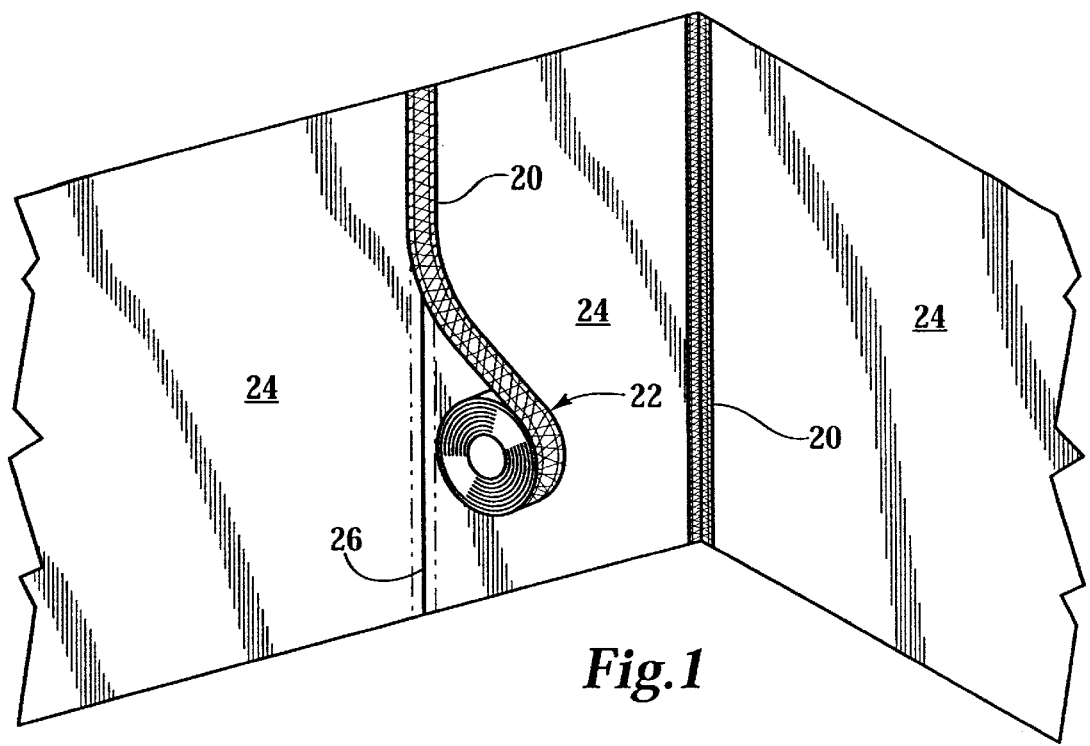
FIG. 1 is a pictorial view representing the tape of this invention being applied to a seam between adjacent sheets of drywall material.
Figure 2:
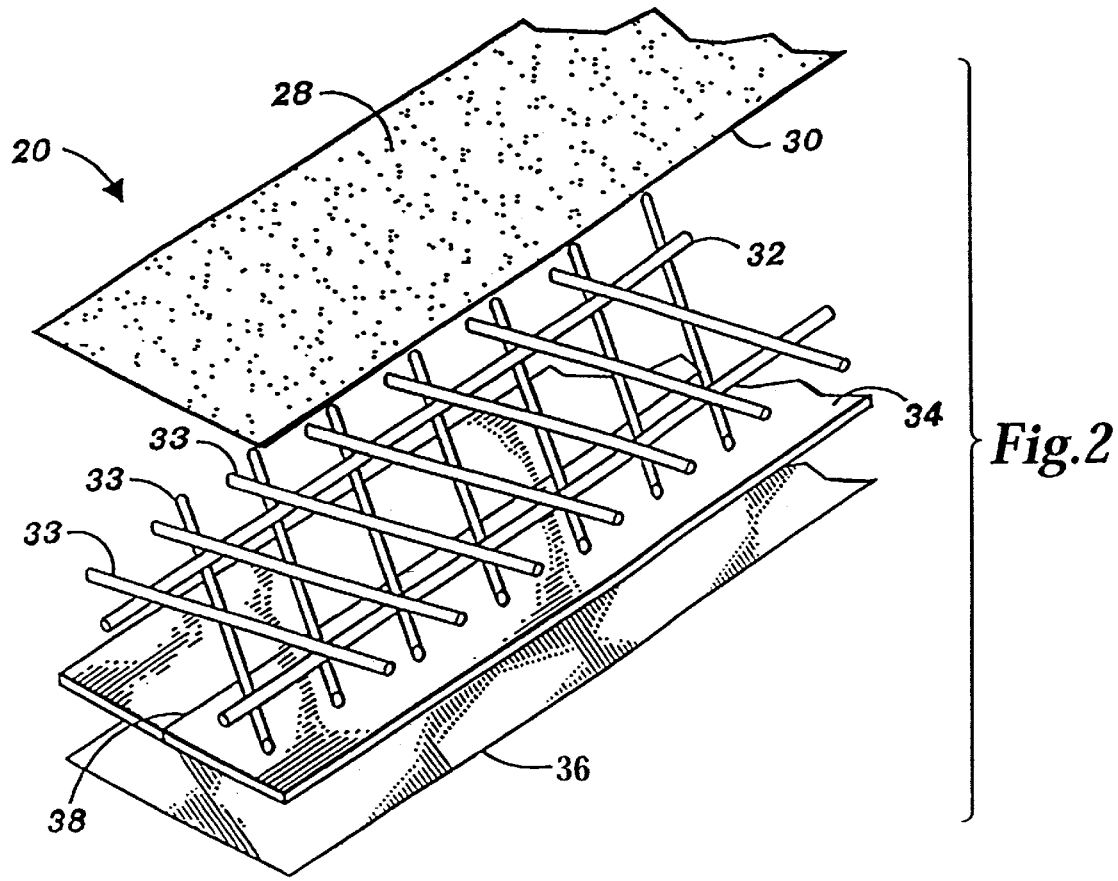
FIG. 2 is an exploded isometric view of the unified layers of the drywall tape of FIG. 1.
Figure 3:
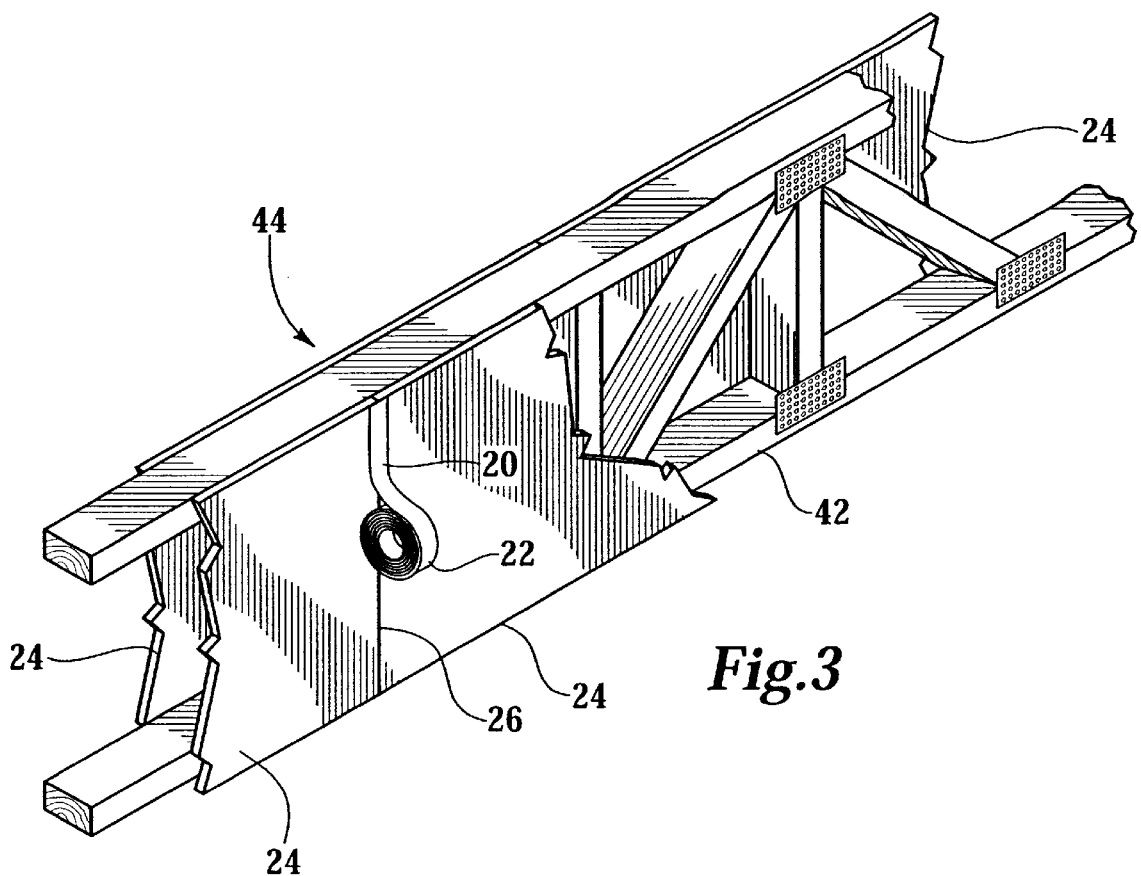
FIG. 3 is an isometric view of the tape of this invention being applied to a seam between adjacent sheets of drywall on a truss in a fire wall application.

Referring more particularly to FIGS. 1–3, wherein like numbers refer to similar parts, the drywall tape 20 of this invention is preferably coiled into rolls 22, as shown in FIG. 1. The tape of this invention is used in the construction of fire walls 44, as shown in FIG. 3. The tape may be constructed of various materials, but its key characteristics are that it has a pressure-sensitive adhesive applied to a base or substrate layer, and is capable of being wound upon itself, due to a release layer attached to the substrate layer. Drywall panels 24 are typically provided in a limited assortment of fixed dimensions, for example four by eight feet. In order to form a wall surface of greater dimensions, a number of drywall panels 24 are affixed to the wall studs in adjacent relationship. The vertically or horizontally mounted drywall panels, which are usually formed of a stiff interior chalk-like material surrounded by a paper coating, present linear grooves or gaps at the seams 26 where the panels 24 abut. In a fire wall, the seams 26 must be bridged by a segment of tape 20, which provides a means for bridging the seam between a first sheet of drywall and a second sheet of drywall.

A common prior art drywall tape was a simple sheet of kraft paper which was adhered to the drywall seam by an application of a gypsum compound or mud. This application of mud was typically messy, and required up to a day to dry.

The tape 20 has a pressure-sensitive adhesive coating 28 which allows the tape 20 to be adhered to the drywall panels 24 without mud or activating liquid. The coating 28 provides a means for adhering the tape to two sheets of drywall in response to the application of pressure. The adhesive 28 is preferably an aqueous-base acrylic adhesive. The quantity of adhesive employed will determine the level of initial tack. An exemplary range of adhesive quantities is five to twelve pounds of adhesive per 3,000 square feet of product, with eight pounds representing a level which balances added adhesive cost with greater initial tack.

As shown in FIG. 2, the adhesive coating 28 is formed on a base layer 30 which is preferably 25–30 pound flat back paper. The base layer 30 is flexible, allowing the tape 20 to be coiled and uncoiled from the roll 22.

A means for reinforcing the tape to resist tearing is provided by a web 32 of fiberglass multi-filamented strands 33 which overlies the paper base layer 30. The strands may be arrayed in a diamond pattern as shown, or may be placed in a rectangular pattern or any other reinforcing array. The fiberglass strands may be those produced by Owens Corning or Pittsburgh Plate Glass Company.

In contrast to some strapping tapes which have strands on a film base running in an exclusively machine direction, the tape 20 has strands which also run in the cross-machine direction, giving the tape tear resistance. The cross direction strands may be 150 1/0 fiberglass strands. Typically, the strands running in the machine direction need not be so strong as the strands running in the cross-machine direction, because there are more strands running in the machine direction.

A top layer 34 is a flexible white paper which overlies the fiberglass web 32 and is permanently adhered to the base paper layer 30 by a hot melt amorphous polypropylene adhesive. The top layer is preferably 25–40 pound paper. The top layer may have a smooth surface, or alternatively it may have a roughened surface.

The tape 20 is manufactured in an automatic process in which the fiber glass strands extend in two patterns, an angled pattern in the cross direction and lengthwise in the machine direction. The sheet with the amorphous polypropylene comes from the bottom around a roll and engages the fiberglass and the top sheet between two rollers. The paper will generally be treated in widths of about 60–72 inches, and later cut down to tape roll size of approximately two inches width. The adhesive for attachment to the wall has not been applied to the base layer at the time of bonding the base layer to the top layer.

In order to prevent the adhesive coating 28 from forming a permanent bond with the top layer 34 when the tape 20 is wound into a roll 22, a means for releasing adhesively attached adjoining layers of tape in the form of a release coating 36 is applied to the top layer 34. The release coating 36 is preferably formed of low density polyethylene, similar to the coating on freezer paper, and is extruded or coated onto the top layer 34. Although the release coating is shown schematically in FIG. 2 as a separate unit, it should be noted that the release coating does not exist as a sheet other than as applied to the top layer 34.

Once the base layer 30 has been laminated to the top layer 34 with the strands 32 therebetween, the adhesive coating 28 is applied and the tape is cut to size and reeled on rolls.

The adhesive coating 28, the base layer 30, the web of strands 32, the top layer 34, and the release coating 36 are bonded to one another in a non-removable fashion to form a multilayer tape 20 which has the necessary attributes to serve for drywall purposes.

In certain construction applications, drywall panels 24 are attached by fasteners to both faces of a supportive substructure such as a structural truss 42. These drywall panels are fire-rated gypsum boards, typically known as "Type X" gypsum boards. Drywall in these applications helps to form a fire wall 44. Fire walls 44 are usually located in attics or in non-dwelling spaces of the building where the appearance of the drywall surface is not of concern. Prior art mudded paper tapes have commonly been used in fire wall applications. The typically tight quarters for attaching the drywall to form fire walls makes the use of mud for adhesive purposes even more cumbersome and unpleasant than usual. As shown in FIG. 3, the self-adhesive tape 20 of this invention may also be employed for construction of a fire wall. To construct a fire wall 44, drywall panels 24 are affixed to the truss 42 in a conventional manner, for example by nails. Drywall panels 24 are positioned on both faces of the truss 42 with the seams 26 between panels on one face of the truss staggered from the seams on the other face. The self-adhesive tape 20 is positioned over each seam 26 and pressed down to attach to the drywall panels 24 on either side of the seam. Because a smooth appearance is not called for in a fire wall, as it will generally not be viewed by the inhabitants, no finishing coat of mud is needed. In short, the entire fire wall construction process can take place with no mud whatsoever. However in some applications, code requirements may require a coat of mud over the tape. Where increased fire burn time is required of the fire wall, a second layer of drywall panels is applied, with the seams staggered from those of the first layer. The tape 20 may also be used for taping the seams of the second layer of drywall. In some circumstances, longer fire burn times may be achieved by using thicker gypsum board panels.

Other embodiments of the tape of this invention may also be employed in fire wall applications.

In one alternative embodiment, the tape is composed of a base layer or substrate formed of bleached kraft white paper, of a weight of 25–40 pounds per ream (per three thousand square feet). The paper has a machine direction tensile strength of 20–40 pounds per lineal inch and a caliper of 2½ to 4 mils.

A release layer is formed on the outward face of the base layer by a silicone based release coating. Approximately 1–1.5 pounds of release coating are applied for each three thousand square feet of substrate surface to be coated. The face of the substrate which engages the fire-rated gypsum board is coated with an aqueous acrylic base adhesive, approximately 12–18 pounds of adhesive for three thousand square feet of substrate.

Another alternative tape of this invention has a substrate or base layer comprised of an extruded sheet of polyethylene or polypropylene, preferably a single ply of material. Similar release and adhesive coatings as described for the kraft paper base layer are applied to the polyethylene or polypropylene base layers. Unlike drywall finishing tape, which must receive an overlying coating of mud, in many fire wall constructions the drywall tape need not be coated with mud. For this reason, the plastic base layers may be impervious to moisture and still function acceptably as a drywall tape, even without perforations.

It is understood that the invention is not limited to the particular construction and arrangement of parts herein illustrated and described, but embraces such modified forms thereof as come within the scope of the following claims.

We claim:

1. A fire wall comprising:

a supportive substructure;

a first sheet of gypsum board fastened to the supportive substructure;

a second sheet of gypsum board fastened to the supportive substructure adjacent to the first sheet to define a seam therebetween; and a strip of drywall tape affixed to the first sheet and the second sheet to bridge the seam, wherein the drywall tape has a pressure-sensitive adhesive which joins an unperforated planar base layer to the gypsum boards and wherein the base layer has a release layer thereon, wherein the release layer is exposed as positioned on the gypsum board and is not covered by any mud.

* * * * *